(12) United States Patent
Kopton

(10) Patent No.: US 10,632,553 B2
(45) Date of Patent: *Apr. 28, 2020

(54) METHOD FOR PRODUCING A THREADED BORE AND TAPPING TOOL BIT

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/317,238

(22) PCT Filed: Jun. 27, 2017

(86) PCT No.: PCT/EP2017/000751
§ 371 (c)(1),
(2) Date: Jan. 11, 2019

(87) PCT Pub. No.: WO2018/010830
PCT Pub. Date: Jan. 18, 2018

(65) Prior Publication Data
US 2019/0337060 A1    Nov. 7, 2019

(30) Foreign Application Priority Data

Jul. 13, 2016 (DE) .......................... 10 2016 008 478

(51) Int. Cl.
*B23G 5/20* (2006.01)
*B23G 1/16* (2006.01)
*B23B 51/08* (2006.01)

(52) U.S. Cl.
CPC ................. *B23G 5/20* (2013.01); *B23G 1/16* (2013.01); *B23B 51/08* (2013.01); *B23G 2200/143* (2013.01); *Y10T 408/9048* (2015.01)

(58) Field of Classification Search
CPC ...... B23G 1/34; B23G 5/20; B23G 2200/143; B23G 1/16; Y10T 408/9048
See application file for complete search history.

(56) References Cited

U.S. PATENT DOCUMENTS 4,271,554 A * 6/1981 Grenell .................... B23G 5/20
408/220
4,651,374 A * 3/1987 Turchan ................. B23G 5/184
408/222

(Continued)

FOREIGN PATENT DOCUMENTS

CN        1575897 A      2/2005
CN      104582895 A      4/2015

(Continued)

OTHER PUBLICATIONS

Office Action dated Aug. 20, 2019, in corresponding Japanese Application No. 2019-501957; 11 pages.

(Continued)

*Primary Examiner* — Eric A. Gates
(74) *Attorney, Agent, or Firm* — Maier & Maier, PLLC

(57) ABSTRACT

A method for producing a threaded bore in a workpiece with a tapping tool bit, which, at its drill bit tip, has a main cutting lip and a thread profile trailing in a tapping direction (I) with at least one thread cutting tooth, wherein, in a tapping stroke (G), the main cutting lip produces a core hole and, at the same time, the thread profile forms an internal thread at the inner wall of the core hole until reaching an intended thread depth ($t_G$), specifically with a tapping feed ($f_G$) in the tapping direction (I).

10 Claims, 8 Drawing Sheets

(56) References Cited

U.S. PATENT DOCUMENTS

| | | | | |
|---|---|---|---|---|
| 4,943,191 | A * | 7/1990 | Schmitt | B23G 5/184 |
| | | | | 408/1 R |
| 5,413,438 | A * | 5/1995 | Turchan | B23G 1/34 |
| | | | | 408/222 |
| 5,678,962 | A | 10/1997 | Hyatt et al. | |
| 6,012,882 | A * | 1/2000 | Turchan | B23G 5/188 |
| | | | | 408/222 |
| 6,231,281 | B1 * | 5/2001 | Nishikawa | B23G 5/184 |
| | | | | 408/222 |
| 6,663,326 | B1 * | 12/2003 | Hiroyasu | B23B 27/18 |
| | | | | 407/118 |
| 10,421,139 | B2 * | 9/2019 | Kopton | B23G 5/20 |
| 2005/0042049 | A1 | 2/2005 | Schwarz | |
| 2008/0170921 | A1 | 7/2008 | Sjoo et al. | |
| 2015/0125229 | A1 | 5/2015 | Glimpel et al. | |

FOREIGN PATENT DOCUMENTS

| | | | | |
|---|---|---|---|---|
| DE | 1818609 | U | 9/1960 | |
| DE | 3921734 | A1 | 1/1991 | |
| DE | 3880394 | T2 | 7/1993 | |
| DE | 3939795 | C2 | 9/1993 | |
| DE | 19651425 | A1 * | 6/1998 | B23G 5/188 |
| DE | 10061476 | A1 | 6/2002 | |
| JP | H06-114631 | A | 4/1994 | |
| JP | 2005-230933 | A | 9/2005 | |
| JP | 2006-082199 | A | 3/2006 | |
| WO | WO-2004022274 | A1 * | 3/2004 | B23B 51/02 |

OTHER PUBLICATIONS

Examination Report dated Jul. 12, 2017 of corresponding German application No. 10 2016 008 478.2; 7 pages.

International Search Report and Written Opinion of the International Searching Authority dated Oct. 5, 2017 in corresponding International application No. PCT/EP2017/000751; 29 pages.

International Preliminary Report on Patentability dated Oct. 29, 2018 in corresponding International application No. PCT/EP2017/000751; 30 pages.

Written Opinion under Rule 66 PCT dated Jun. 19, 2018 in corresponding International application No. PCT/EP2017/000751; 13 pages.

Office Action dated Aug. 1, 2019, in corresponding Chinese Application No. 201780043304.8; 10 pages.

Notification of Transmittal of Translation of the International Preliminary Report on Patentability dated Jan. 17, 2019 in corresponding International Application No. PCT/EP2017/000751; 6 pages.

* cited by examiner

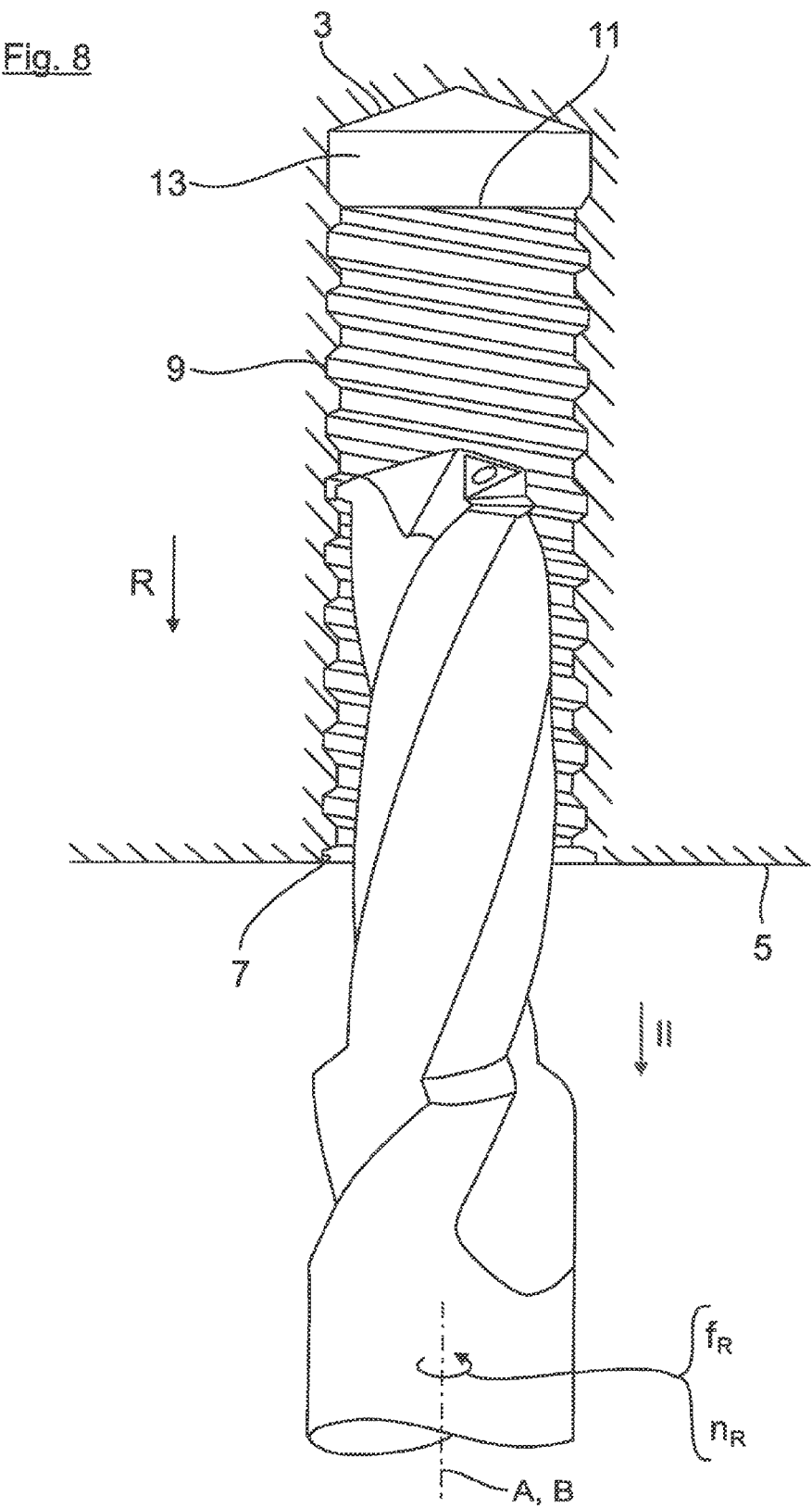

METHOD FOR PRODUCING A THREADED BORE AND TAPPING TOOL BIT

FIELD

The invention relates to a method for producing a threaded bore, in particular a threaded blind bore.

BACKGROUND

Usually, during tapping, a core hole is produced in the workpiece in a first process step by means of a drill bit. Subsequently, in a second process step, an internal thread is cut in the core hole by means of a separate tapping drill bit. Depending on its size, the tapping drill bit has two or a plurality of cutting lips. The cutting lips have teeth, each of which removes a chip of material from the inner wall of the core hole and, if need be, deforms the material plastically to a small extent. The teeth of the tapping drill bit are different in form; for example, they are flattened to different extents. In this way, when cutting, each tooth entrains with it roughly equally sized material chips.

In distinction to the above tapping process, the generic method occurs using a percussion tapping tool bit, in which the drilling of the core hole and the cutting of the internal thread are carried out in a joint tool bit stroke. At its drill bit tip, the percussion tapping tool bit has a main cutting lip and a thread profile, which trails in a tapping direction and has at least one thread cutting tooth. In the method, there occurs a tapping stroke and subsequently a reversing stroke in the opposite direction. In the tapping stroke, on the one hand, the main cutting lip produces the core hole and, on the other hand, the thread profile forms the internal thread at the inner wall of the core hole until a useable intended thread depth is reached. The tapping stroke is carried out with a tapping feed and at a tapping speed, synchronized therewith, of the tapping tool bit. In a following reversing stroke in the opposite direction, the tapping tool bit is guided out of the threaded bore in a reversing direction, specifically with an opposite reversing feed and at a reversing speed synchronized therewith. In this way, it is ensured that the thread profile of the tapping tool bit is moved in the thread pitch of the internal thread in a stress-free manner.

In the above method, at the end of the tapping stroke, the tapping process is slowed; that is, the tapping feed and the tapping speed synchronized therewith are reduced to 0. However, in the prior art, this retardation of the thread cutting process to a tapping speed of zero has led to an excessively large cutting stress on the thread profile, which can lead to cutting teeth being broken out or the tool bit being broken.

Known from DE 38 80 394 T2 is a combined tool bit for drilling a hole and for cutting a thread. The tapping tool bit is used initially to produce a core hole. Subsequently, the tapping tool bit is moved by its tool bit axis in a circular path around the axis of the bore, specifically with rotation of the tapping tool bit, as a result of which the thread profile forms an internal thread in the core hole. Essentially the same method is known from DE 39 39 795 T2 and from U.S. Pat. No. 5,678,962.

Known from JP 2005 230933 A is a generic method for producing a threaded bore in a workpiece. Tapping tool bits for producing a threaded bore in a workpiece are known from DE 39 21 734 A1, from US 2008/170921 A1 and from DE 100 61 476 A1. Another tapping tool bit is known from DE 18 18 609 U.

An object of the invention is in providing a method for producing a threaded bore in a workpiece as well as a tapping tool bit for carrying out the method, in which the tool bit stress is reduced.

The reversing stroke does not occur immediately after the tapping stroke, but rather follows a groove forming step, in which a pitch-free encircling groove adjoining the internal groove is formed, in which the thread profile of the tapping tool bit can rotate in a stress-free manner. In this way, the tapping speed can be reduced to 0, without an excessively large cutting lip stress leading to the tool bit being broken or the thread profile breaking out.

As mentioned above, the thread profile of the tapping tool bit can rotate in a stress-free manner in the pitch-free encircling groove produced in the groove forming step. In addition, the provision of the encircling groove makes is possible for the tapping tool bit to use a cutting lip to produce an encircling thread countersink in the bore opening of the bore. The encircling thread countersink can thus be produced during the above groove forming step.

In a first embodiment, the tapping tool bit can be utilized as a pre-processing tool bit. In this case, the pre-processed threaded bore must be post-processed in a post-processing step with the help of a finishing tool bit. As a finishing tool bit, it is possible to utilize a thread former, a helical thread former, or an axial thread former. Alternatively to this, in a second embodiment, the thread tapping tool bit itself can be formed as a finishing tool bit. In this case, the above-mentioned additional post-processing step can be dispensed with.

In a technical implementation, the tapping stroke can be lengthened in the tapping direction directly with a groove forming stroke. In this case, the thread tapping tool bit is moved beyond the intended thread depth until an intended bore depth is reached, specifically with a groove forming feed as well as at a groove forming speed that are not synchronized with each other and/or are different from the tapping feed and from the tapping speed.

It is preferred when, at the end of the groove-forming step, the thread profile can rotate completely in the encircling groove of the threaded bore in a stress-free manner. The encircling groove is produced during the groove-forming stroke with the aid of the main cutting lip as well as of the thread cutting tooth (or general thread tooth) of the thread profile at the tapping tool bit.

When the intended bore depth is reached, the groove forming feed is reduced to 0. At the same time, the groove forming speed is also reduced to 0 in order to make possible the reversal in the direction of rotation that is required for the reversing stroke.

At the start of the reversing stroke, the tapping tool bit is controlled in such a way that the thread cutting tooth can be driven in a stress-free manner into the thread pitch outlet, which opens into the encircling groove. Subsequently, the tapping tool bit is guided out of the threaded bore in a direction that is opposite to the tapping direction, specifically with a reversing feed as well as at a reversing speed synchronized therewith, as a result of which the thread cutting tooth can be rotated out of the threaded bore without removal of material.

While the tapping stroke, the groove forming stroke, and the reversing stroke are being carried out, the longitudinal axis of the core hole and the rotational axis of the tapping tool bit preferably remain aligned at all times coaxially to each other.

A tapping tool bit for carrying out such a method can preferably have a clamping shank and a tapping body adjoined to it. Along the longitudinal axis thereof, at least one chip groove can extend to a front-end main cutting lip at the drill bit tip. At the front-end main cutting lip, a chip surface, which bounds the chip groove, and a front-end free surface of the drill bit tip converge. As viewed in the peripheral direction of the tool bit, the chip groove can be bounded by at least one drill bit web. The chip surface of the chip groove can transition, with formation of an auxiliary cutting lip, into a back surface of the drill bit web on the outer peripheral side. At the back surface of the drill bit web on the outer peripheral side, the thread profile can be formed with at least one thread cutting tooth. The tooth height of the thread cutting tooth is dimensioned in the radial direction in such a way that the thread cutting tooth protrudes outward over the main cutting lip in the radial direction by a radial offset. If need be, the thread cutting tooth can flushly extend the main cutting lip outward in the radial direction. Alternatively and/or additionally, as viewed in the axial direction, the thread cutting tooth can be arranged at an axial offset behind the main cutting lip.

In a preferred embodiment variant, the thread tapping tool bit can have three drill bit webs. Each of these drill bit webs is formed with at least one thread cutting tooth. The thread cutting teeth are preferably formed with cutting geometries that are not identical, but are rather different in form. By way of example, in the peripheral direction of the drill bit, a pre-cutting tooth, a middle cutting tooth, and a finishing cutting tooth of different cutting geometry are formed in succession at the drill bit. The cutting teeth are formed at the thread tapping tool bit in an offset manner with respect to each other in the axial direction. The extents of offset thereof are matched to the thread tapping speed and to the tapping feed in such a way that a flawless thread cutting is ensured.

The advantageous embodiments and/or enhancements of the invention explained above and/or presented in the dependent claims—apart from cases of clear dependencies or inconsistent alternatives, for example—can be implemented individually or else in any combination with one another.

BRIEF DESCRIPTION OF THE DRAWINGS

The invention and its advantageous embodiments and enhancements as well as the advantages thereof are explained in detail below on the basis of drawings.

Shown are:
FIG. 8 lateral producing the threaded blind bore.

DETAILED DESCRIPTION

Figure 1:
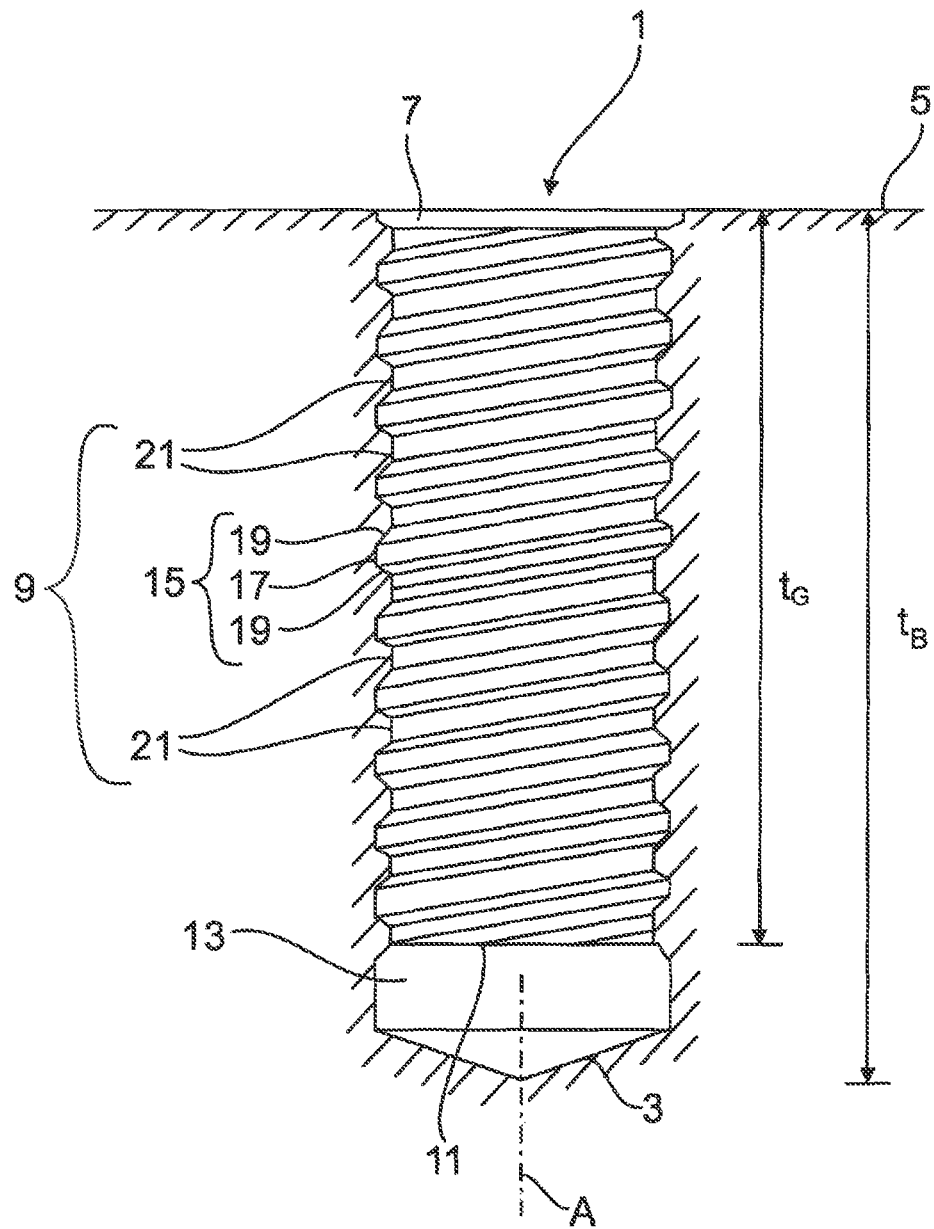
FIG. 1 lateral cross sectional illustration, a threaded blind bore formed in a workpiece.

Shown in FIG. 1 is a finished threaded blind bore 1. The bore 1, which has a bore bottom 3, is worked to a target bore depth $t_B$ in a workpiece 5 by means of a so-called percussion drill processing, which will be explained later on the basis of FIGS. 5 to 8. At its bore opening, the bore 1 has an encircling thread countersink 7, which, in the further course, transitions downward into an internal thread 9. The internal thread 9 extends along the bore axis A to a useable intended thread depth $t_G$. As further ensues from FIG. 1, a thread pitch 15 of the internal thread 9 opens with a thread outlet into an encircling groove 13. Said groove does not have a thread pitch and, as viewed in the axial direction, is formed between the internal thread 9 and the bore bottom 3. The thread pitch 15 has a radially outer thread root 17 as well as lateral thread flanks 19, which transition radially inward into an inner thread crest 21.

Figure 2:
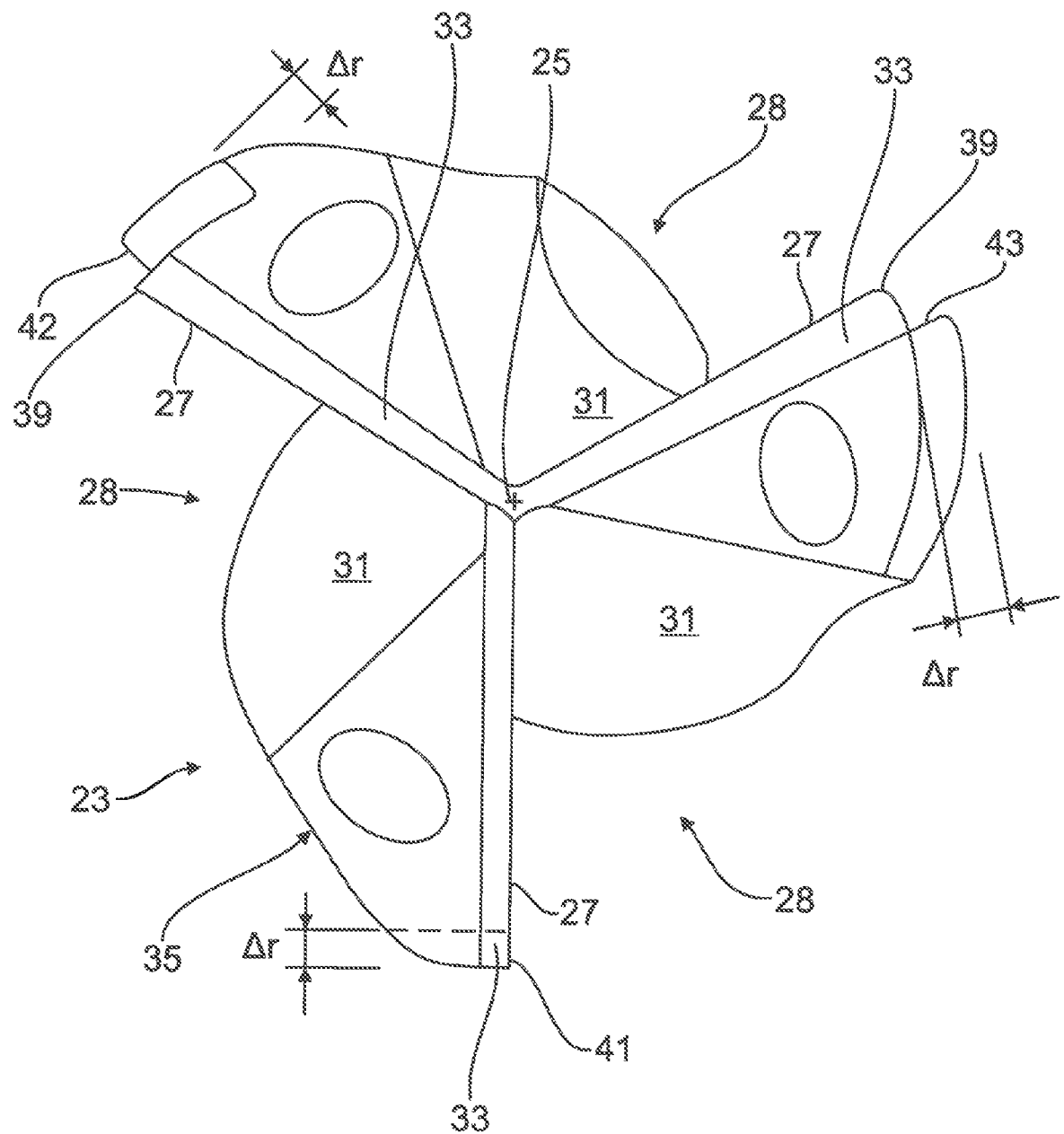
FIG. 2 front view of a tapping tool bit in a view from the front.
Figure 3:
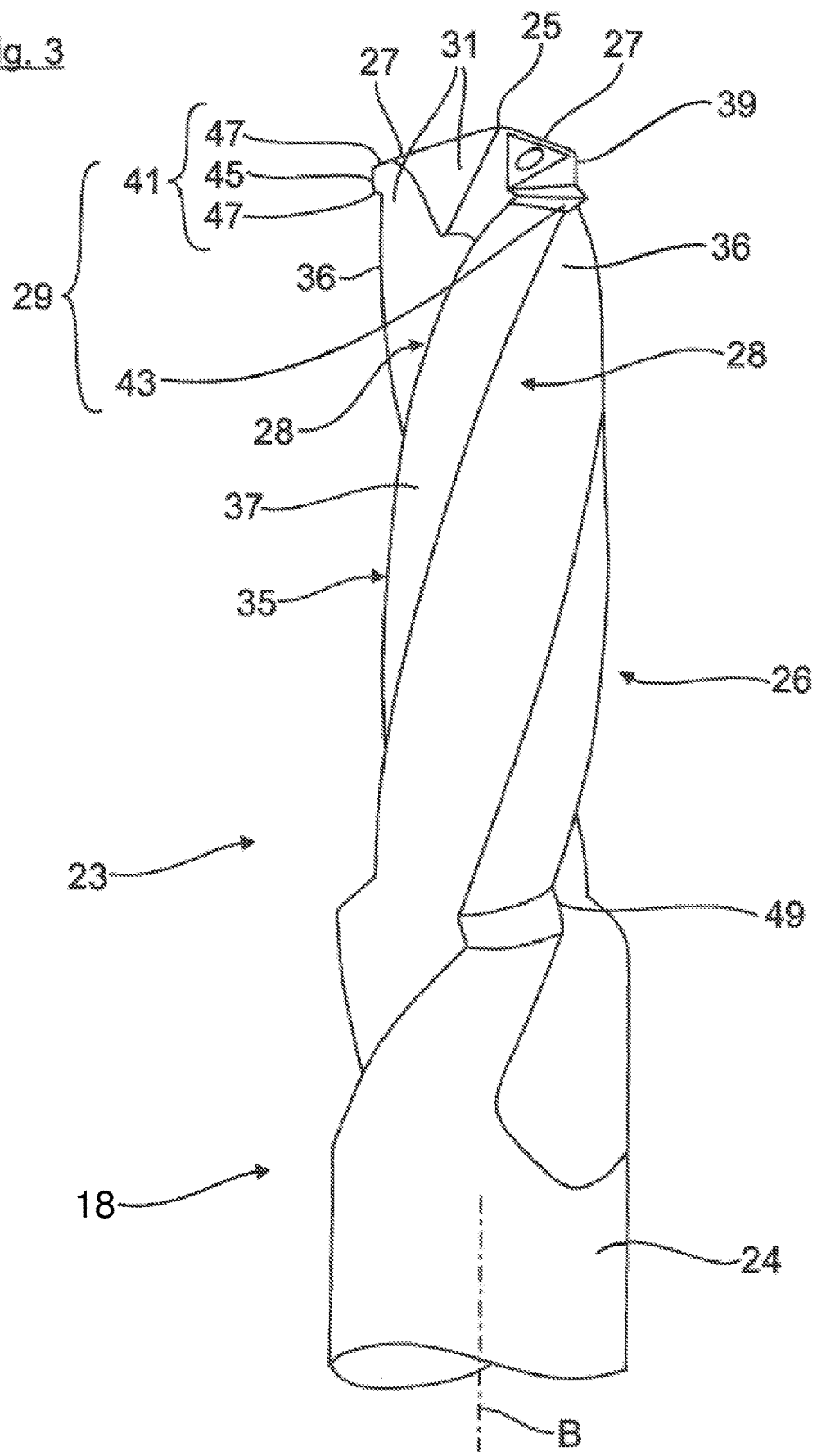
FIG. 3 lateral view of the tapping tool bit.
Figure 4:
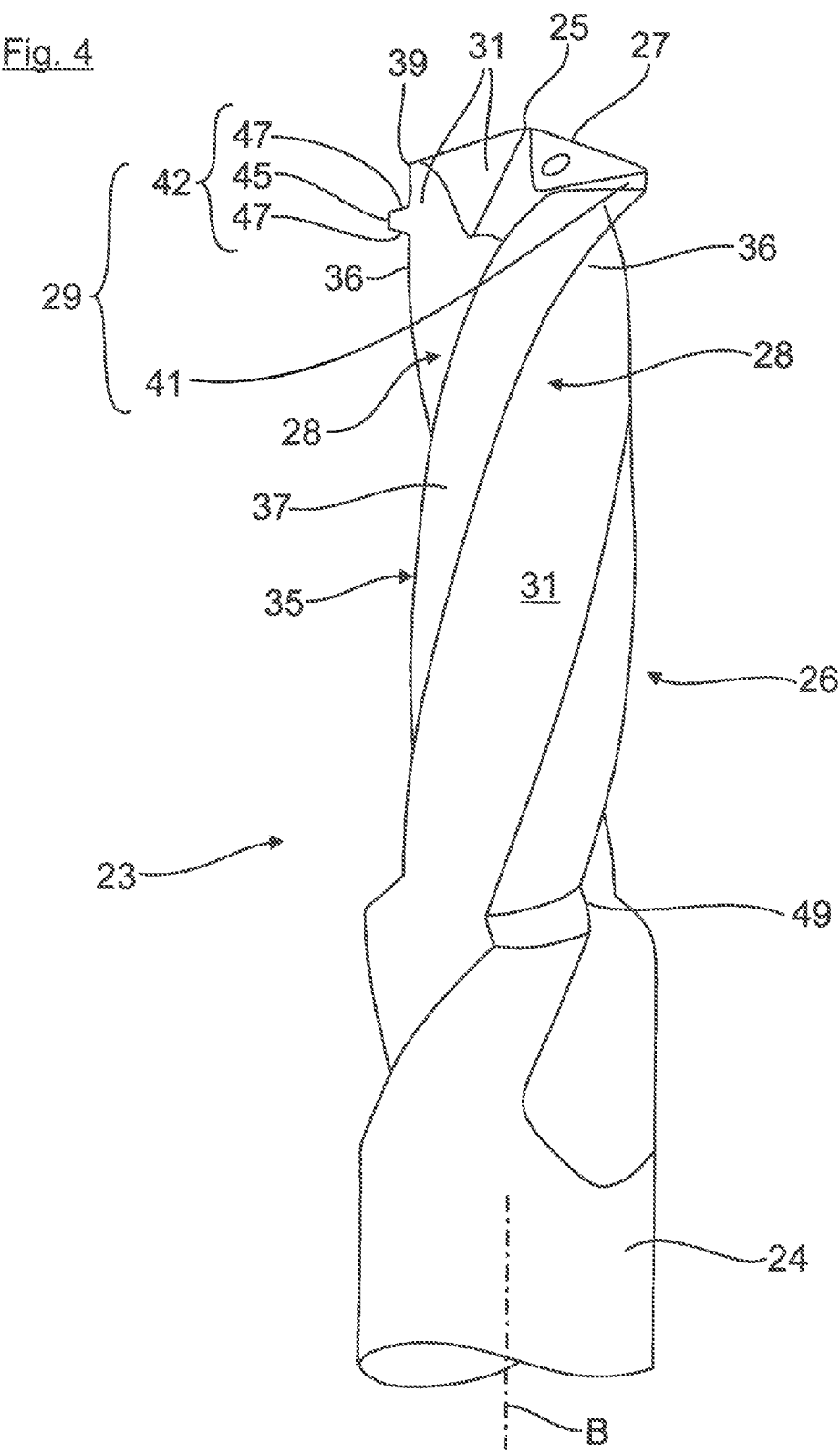
FIG. 4 lateral view of the tapping tool bit.
Figure 5:
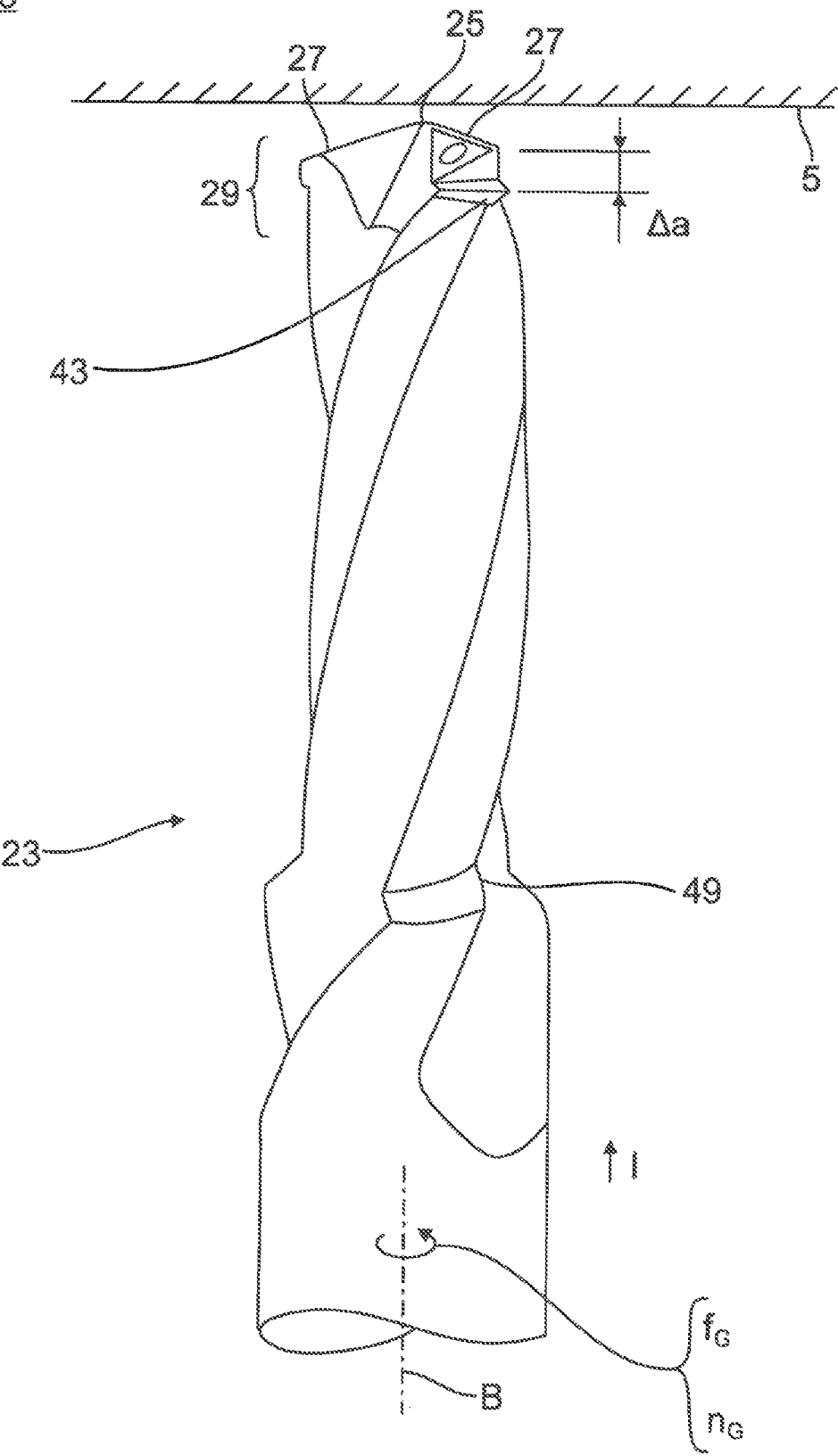
FIG. 5 side view producing the threaded blind bore.
Figure 6:
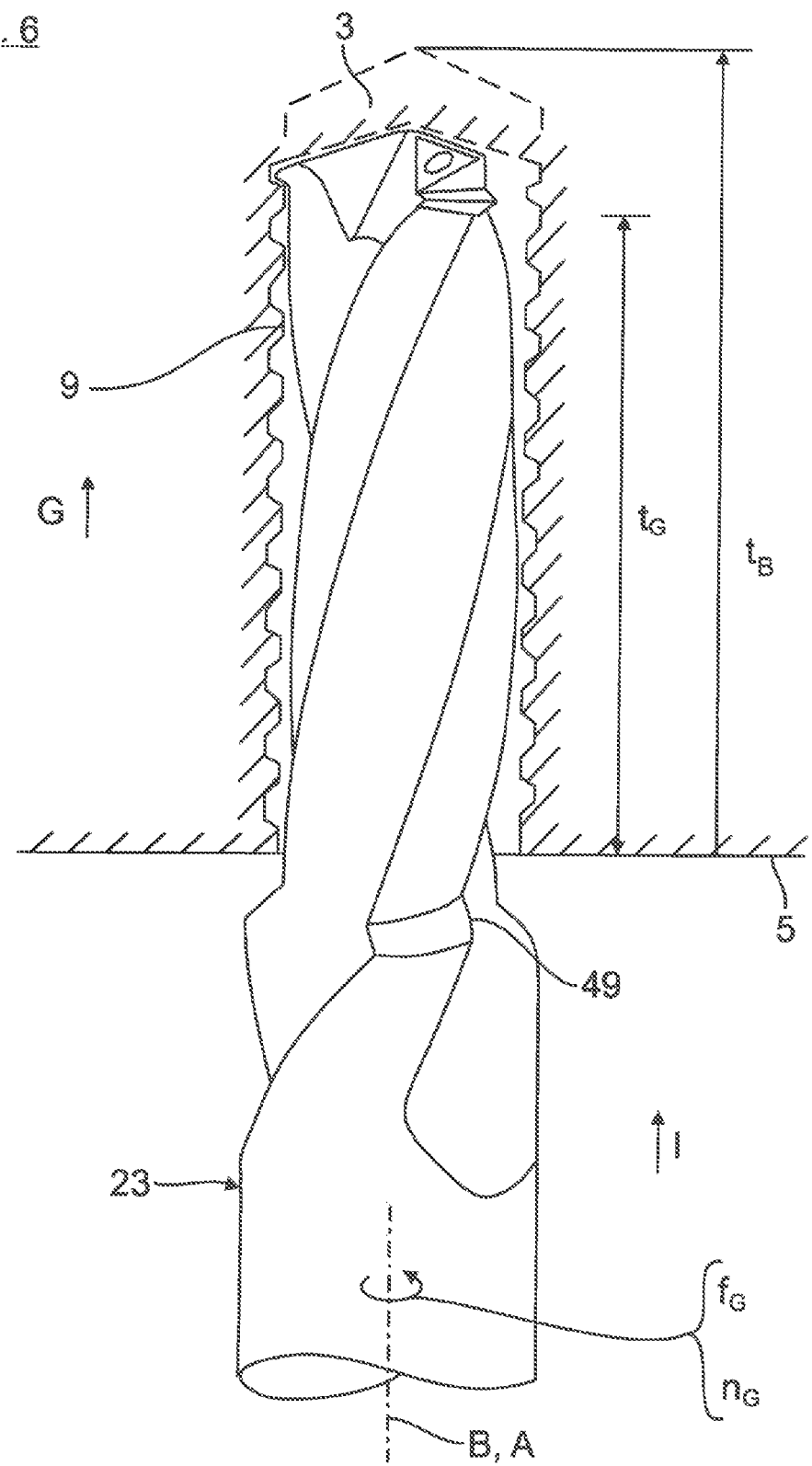
FIG. 6 lateral producing the threaded blind bore.

The threaded blind bore 1 shown in FIG. 1 is made by use of the tapping tool bit 23 described below on the basis of FIGS. 2 to 4. In accordance therewith, at its drill bit tip 25, the tool bit 23 in FIG. 2 has three uniformly peripherally distributed, front-end main cutting lips 27 as well as a thread profile 29 trailing in the tapping direction I (FIG. 5 or 6).

The tool bit 23 is constructed with a clamping shank 24 as well as with an adjoining tapping body 26, along the bore axis A of which a total of three chip grooves 28, which are distributed on the peripheral side, extend to the respective front-end main cutting lip 27 at the drill bit tip 25.

At each main cutting lip 27, a chip surface 31, which bounds the chip groove 28, and a front-end free surface 33 of the drill bit tip 25 converge. In the peripheral direction of the tool bit, the respective chip groove 28 is bounded by a drill bit web 35. Overall, the thread tapping tool bit 23 shown in the figures has three drill bit webs 35. In this case, the chip surface 31 of the chip groove 28 transitions, with the formation of an auxiliary cutting lip 36, into a back surface 37 of the respective drill bit web 35 on the outer peripheral side. The auxiliary cutting lip 36 and the front-end main cutting lip 27 converge at a radially outer main cutting corner 39.

At the back surfaces 37 of the three drill bit webs 35 on the outer peripheral side, the thread profile 29 has, in each case, a pre-cutting tooth 41, a middle cutting tooth 42, and a finishing cutting tooth 43. Each of the cutting teeth 41, 42, 43 is formed with a radially outer thread-root cutting edge 45 as well as with thread-flank cutting lips 47 in order to cut/to form the thread pitch 15 shown on the basis of FIG. 1. In this case, the cutting teeth 41 to 43 are designed with different geometries and are spaced at different axial distances Δa (only indicated in FIG. 5) from the drill bit tip 25 in order to cut the thread pitch 15 of the internal thread 9 shown in FIG. 1. By way of example, the pre-cutting, middle, and finishing cutting teeth 41, 42, 43 have different axial dimensions in the axial direction and/or different cutting tooth heights Δr (FIG. 2) in the radial direction. By way of example, the pre-cutting, middle, and finishing cutting teeth 41, 42, 43 become axially larger in the peripheral direction. The finishing cutting tooth 43 then cuts the entire internal thread contour. Alternatively to this, the finishing cutting tooth 43 can also be designed as a forming tooth in order to increase the thread strength.

In addition, at the transition between the thread tapping body 26 and the clamping shank 24, the thread tapping tool bit 23 has a cutting edge 49 for formation of the thread countersink 7 shown in FIG. 1.

Described below on the basis of FIGS. 5 to 8 is the method for producing the threaded blind bore 1 shown in FIG. 1: In accordance therewith, in FIG. 1, the tapping tool bit 23 is guided in a thread tapping direction I on the not yet predrilled tool bit 5 and a percussion drilling is carried out. In the tapping stroke G, the main cutting lips 27 produce a core hole and, at the same time, the trailing thread profile 29 produces the internal thread 9 at the inner wall of the core hole. The tapping stroke G occurs with a tapping feed $f_G$ and at a tapping speed $n_G$ synchronized therewith in a tapping rotational direction, specifically until the intended thread depth $t_G$ is reached (FIG. 6).

Immediately afterwards, a groove forming step (FIG. 7) is carried out, in which the threaded bore stroke G is lengthened in the tapping direction I by a groove forming stroke N. In the groove forming stroke H [sic], in contrast to the thread forming stroke G, the groove-forming feed $f_N$ and the groove forming speed $n_N$ of the tapping tool bit 23 are not synchronized with each other and are different from the preceding tapping feed $f_G$ and from the tapping speed $n_G$.

Figure 7:
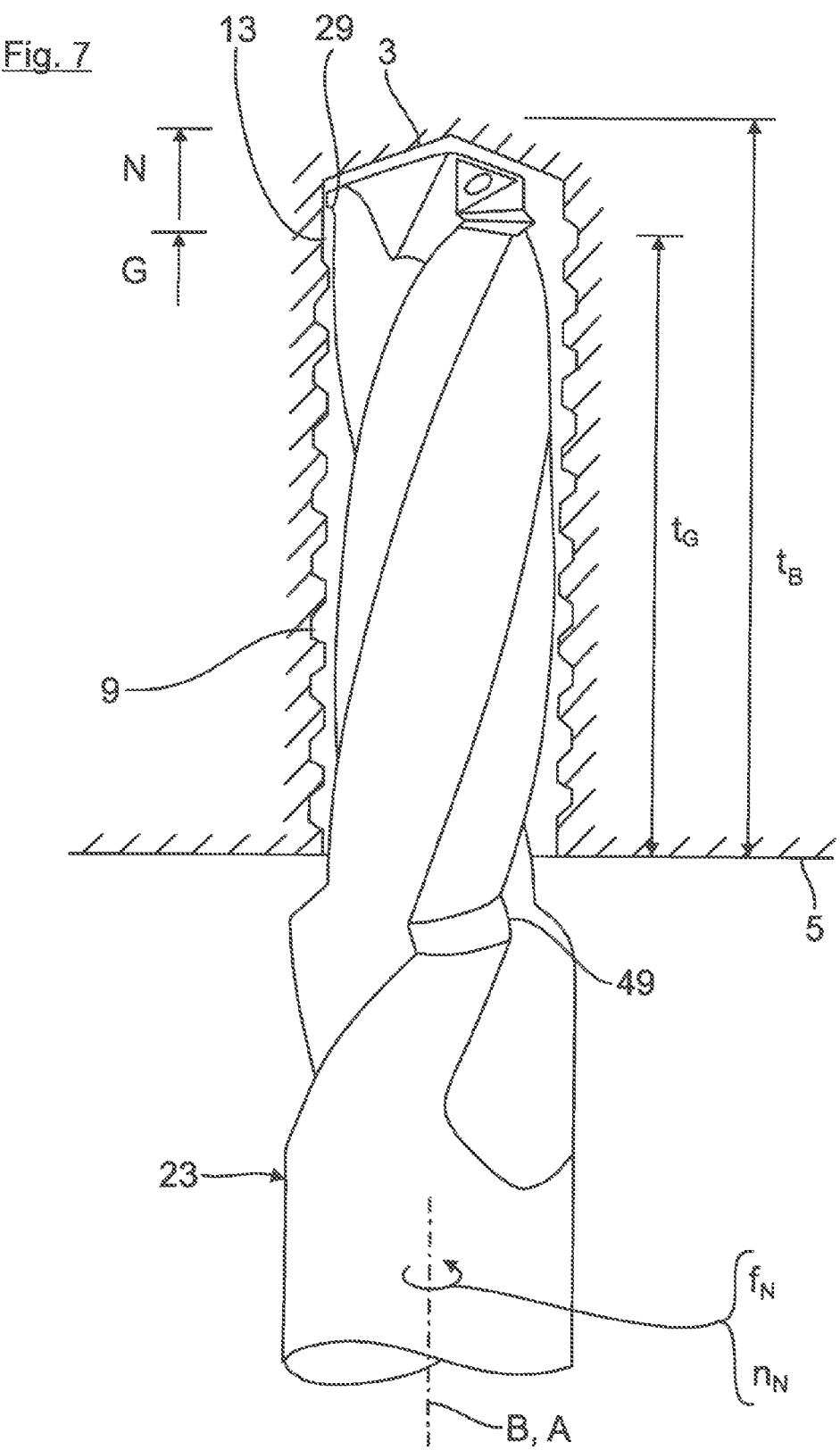
FIG. 7 lateral producing the threaded blind bore.

In this way, by use of its precutting, middle, and finishing cutting teeth 41, 42, 43, the thread profile 29 produces the encircling groove 13 shown in FIG. 7, in which the thread profile 29 can rotate in a stress-free manner. The groove forming feed $f_N$ as well as the groove forming speed $n_N$ are set in such a way that an excessively large cutting stress placed on the cutting teeth 41 to 43 is prevented.

When the intended bore depth $t_B$ is reached, both the groove forming feed $f_N$ and the groove forming speed $n_N$ are reduced to 0. Subsequently, for preparation of a reversing stroke R (FIG. 8), a reversal of the feed occurs. In the reversing stroke R (FIG. 8), the tapping tool bit 23 is guided out of the threaded bore 1 in a reversing direction II (FIG. 8), specifically with an opposite reversing feed $f_R$ as well as at a speed synchronized therewith. These parameters are of such values that the thread profile 29 of the tapping tool bit 23 is guided out of the threaded bore 1 in the thread pitch 15 of the internal thread 9 in a largely stress-free manner.

At the start of the reversing stroke R, the tapping tool bit 23 is controlled by the fabrication unit in such a way that the cutting teeth 41, 42, 43 are each driven in a stress-free manner into the thread pitch outlet 11, which opens into the encircling groove 13. In the further course of the reversing stroke R, the thread profile 29 of the tapping tool bit 23 is then rotated in a stress-free manner outwards through the thread pitch 15 of the internal thread 9.

As a finishing tool bit 18, it is possible to utilize a thread former, a helical thread former, or an axial thread former. Alternatively, the thread tapping tool bit 23 itself can be formed as a finishing tool bit 18.

The invention claimed is:

1. A method for producing a threaded bore comprising: a workpiece and a tapping tool bit, the tapping tool bit has, at its drill bit tip, a main cutting lip and a thread profile, trailing in a tapping direction (I) with at least one thread cutting tooth, wherein, in a tapping stroke (G), the main cutting lip produces a core hole and, at the same time, the thread profile forms an internal thread on the inner wall of the core hole until an intended thread depth ($t_G$) is reached, specifically with a tapping feed ($f_G$) in the tapping direction (I) and at a tapping speed ($n_G$) of the tapping tool bit synchronized therewith, wherein, after the tapping stroke (G), a reversing stroke (R) occurs in the opposite direction, in which the tapping tool bit is guided out of the threaded bore in a reversing direction (II), specifically with an opposite reversing feed ($f_R$) and at a reversing speed ($n_R$) synchronized therewith, so that the thread profile of the tool bit is guided out of the bore in the thread pitch of the internal thread, wherein, between the tapping stroke (G) and the reversing stroke (R), there occurs a groove forming step, in which the tapping stroke (G) is lengthened in the tapping direction (I) by a groove forming stroke (N), specifically to form a pitch-free encircling groove adjoining the internal thread, in which the thread profile can rotate in a stress-free manner.

2. The method according to claim 1, wherein, in the groove forming step, the tapping tool bit is moved beyond the intended thread depth ($t_G$) until reaching an intended bore depth ($t_B$) in the tapping direction (I), specifically with a groove forming feed ($f_N$) and at a groove forming speed ($n_N$) that are not synchronized with each other and/or are different from the tapping feed ($f_G$) and from the tapping speed ($n_G$).

3. The method according to claim 1, wherein, in the groove forming step, the thread profile of the tapping tool bit rotates completely in the encircling groove the threaded bore.

4. The method according to claim 1, wherein the encircling groove is formed during the groove forming stroke (N) by means of the main cutting lip and the thread cutting tooth of the thread profile.

5. The method according to claim 1, wherein, when the intended bore depth ($t_B$) is reached, the groove forming feed ($f_N$) is reduced to 0 and the groove forming speed ($n_N$) is reduced to 0 for preparation of a reversal of direction required for the reversing stroke (R).

6. The method according to claim 1, wherein, at the start of the reversing stroke (R), the tapping tool bit is controlled in such a way that the thread cutting tooth is driven in a stress-free manner, without removal of material, into a thread pitch outlet, which opens into the encircling groove.

7. The method according to claim 1, wherein, during the tapping stroke (G), the groove forming stroke (N), and the reversing stroke (R), the rotational axis (B) of the tapping tool bit and the longitudinal axis (A) of the bore are aligned coaxially to each other.

8. The method according to claim 1, wherein the tapping tool bit is utilized as a pre-processing tool bit, and in that the pre-processed threaded bore is post-processed in a post-processing step by use of a finishing tool bit, wherein, as the finishing tool bit, a thread former, a helical thread former, or an axial thread former can be utilized.

9. The method according to claim 1, wherein the tapping tool bit itself is utilized as a finishing tool bit.

10. A tapping tool bit for producing a threaded bore in a workpiece, with a clamping shank and a tapping body that is adjoined to it, and along the longitudinal axis (A) of which, at least one chip groove extends up to a front-end main cutting lip at a drill bit tip, at which front-end main cutting lip, a chip surface bounding the chip groove and a front-end free surface of the drill bit tip converge, wherein, in the peripheral direction of the tool bit, the chip groove is bounded by at least one drill bit web, and the chip surface of the chip groove transitions, with the formation of an auxiliary cutting lip, into a back surface of the drill bit web on the outer peripheral side, and wherein the auxiliary cutting lip and the front-end main cutting lip converge at a radially outer main cutting corner, wherein, at the back surface of the drill bit web on the outer peripheral side, a thread profile with at least one thread-profile cutting tooth is formed, wherein the thread profile cutting tooth has a radially outer profile base cutting edge, which protrudes radially outward over the main cutting corner by a tooth height ($\Delta r$), wherein the tapping tool bit is formed with a cutting edge, with which an encircling thread countersink is produced in the bore opening of the bore, and in that the encircling thread countersink is produced during the groove forming step.

* * * * *